United States Patent
Sabapathy et al.

(10) Patent No.: US 12,061,639 B2
(45) Date of Patent: Aug. 13, 2024

(54) MACHINE LEARNING TECHNIQUES FOR HIERARCHICAL-WORKFLOW RISK SCORE PREDICTION USING MULTI-PARTY COMMUNICATION DATA

(71) Applicant: Optum Services (Ireland) Limited, Dublin (IE)

(72) Inventors: Rajesh Sabapathy, Gurgaon (IN); Gourav Awasthi, Gurugram (IN); Rebin Raju, Dublin (IE); Chirag Mittal, Gurgaon (IN); Sharenna D. Gonzalez, Ranson, WV (US)

(73) Assignee: OPTUM SERVICES (IRELAND) LIMITED, Dublin (IE)

( * ) Notice: Subject to any disclaimer, the term of this patent is extended or adjusted under 35 U.S.C. 154(b) by 0 days.

(21) Appl. No.: 17/937,190

(22) Filed: Sep. 30, 2022

(65) Prior Publication Data

US 2024/0111799 A1    Apr. 4, 2024

(51) Int. Cl.
   *G06F 16/35*   (2019.01)
   *G06F 16/332*  (2019.01)
   *G06N 20/00*   (2019.01)

(52) U.S. Cl.
   CPC .......... *G06F 16/35* (2019.01); *G06F 16/3329* (2019.01); *G06N 20/00* (2019.01)

(58) Field of Classification Search
   CPC ...... G06F 16/35; G06F 16/3329; G06N 20/00
   See application file for complete search history.

(56) References Cited

U.S. PATENT DOCUMENTS

| | | | |
|---|---|---|---|
| 9,413,877 | B2 | 8/2016 | Aldrich et al. |
| 10,051,122 | B2 | 8/2018 | Raanani et al. |
| 10,178,232 | B1 | 1/2019 | Cheek et al. |
| 10,275,522 | B1 | 4/2019 | Hernandez |
| 11,496,501 | B1 * | 11/2022 | Liu ..................... G06N 5/04 |
| 2017/0316508 | A1 | 11/2017 | Seale |
| 2020/0074312 | A1 | 3/2020 | Liang et al. |
| 2020/0327394 | A1 | 10/2020 | Hultgren et al. |
| 2021/0240556 | A1 | 8/2021 | Breen et al. |
| 2021/0256452 | A1 | 8/2021 | Lavigne et al. |

(Continued)

OTHER PUBLICATIONS

Murphy, Naomi. "Keeping Members In Mind: Optimizing Coordination of Benefits," Cotiviti, (11 pages), May 23, 2021, [article], available online: https://blog.cotiviti.com/keeping-members-in-mind-optimizing-coordination-of-benefits.

*Primary Examiner* — Mariela Reyes
*Assistant Examiner* — Courtney Harmon
(74) *Attorney, Agent, or Firm* — Alston & Bird LLP

(57) ABSTRACT

Various embodiments of the present invention provide methods, apparatus, systems, computing devices, computing entities, and/or the like for performing predictive data analysis operations. Certain embodiments of the present invention utilize systems, methods, and computer program products that perform predictive data analysis operations by generating a hybrid class for a multi-party communication transcript data object associated with a predictive entity utilizing a hybrid space classification machine learning model, generating a machine learning-based risk score utilizing a hybrid-class-based risk scoring machine learning model, and generating a hierarchical-workflow risk score using a hierarchical risk score adjustment workflow.

20 Claims, 11 Drawing Sheets

(56) References Cited

U.S. PATENT DOCUMENTS

| | | |
|---|---|---|
| 2021/0304747 A1 | 9/2021 | Haas et al. |
| 2023/0222212 A1* | 7/2023 | Mullins .................. G06F 21/54 |
| | | 726/26 |

* cited by examiner

Agent: can you confirm your date of birth as well as roberts .
Caller: one nine forty five . five twenty one thirty six
Agent: how can i help you?
Caller: i'm calling for my husband right ... he's on dialysis but i don't think that has anything to do with four wheels ... so a friday he took um ... for ... um in our building in the lobby and ... i would dealing is ... in his head against the brick .
Agent: oh no .
Caller: yeah ... they ... missus i about ... well you can't see how i'm pointing that much but he had have stitches above is i brough ... so he was walking with a k and that's no longer good for him he needs a walker or the one with the seat ... so do you cover that?

|  | Primary Class | Secondary Class |
|---|---|---|
| Sr. No. | Call Reason | Additional Context |
| 1 | Appeal/Grievance - Expedited | Appeal - Expedited Request Denied |
| 2 | Appeal/Grievance - Expedited | Appeal - Expedited Request Granted |
| 3 | Appeal/Grievance - Received Inquiry | Appeal - Denied / Upheld |
| 4 | Appeal/Grievance - Received Inquiry | Appeal - Granted / Approved |
| 5 | Appeal/Grievance - Requested By Member | Appeal - Filed by Agent |
| 6 | Appeal/Grievance - Requested By Member | Appeal - Member Will Submit |
| 7 | Appeal/Grievance - Status | Appeal - Not received |
| 8 | Appeal/Grievance - Status | Appeal - On File |
| 9 | Appeal/Grievance - Status | Appeal - Denied / Upheld |
| 10 | Appeal/Grievance - Status | Appeal - Granted / Approved |
| 11 | Benefits - Balance Inquiry | Benefits – Deductible |
| 12 | Benefits - Balance Inquiry | Benefits – HSA/FSA |
| 13 | Benefits - Balance Inquiry | Benefits - OOP Maximum |
| 14 | Benefits - Balance Inquiry | Benefits – OTC Balance |
| ... | ... | ... |

FIG. 6

Date: May, 02, 2021
COB Leads:

| Member ID | Hierarchical-workflow risk score |
|---|---|
| 11111111 | 1 |
| 22222222 | 0 |

FIG. 11

MACHINE LEARNING TECHNIQUES FOR HIERARCHICAL-WORKFLOW RISK SCORE PREDICTION USING MULTI-PARTY COMMUNICATION DATA

BACKGROUND

Various embodiments of the present invention address technical challenges related to performing risk score predictions using multi-party communication data and disclose innovative techniques for efficiently and effectively performing hierarchical-workflow risk score predictions using multi-party communication data.

BRIEF SUMMARY

In general, various embodiments of the present invention provide methods, apparatus, systems, computing devices, computing entities, and/or the like for performing hierarchical-workflow risk score predictions using multi-party communication data. Certain embodiments of the present invention utilize systems, methods, and computer program products that perform hierarchical-workflow risk score predictions using multi-party communication transcript data objects by performing data predictive data analysis operations that comprise generating, utilizing a hybrid space classification machine learning, a hybrid class for a multi-party communication transcript data object associated with a predictive entity, generating a machine learning-based risk score utilizing a hybrid-class-based risk scoring machine learning model, and generating a hierarchical-workflow risk score using a hierarchical risk score adjustment workflow.

In accordance with one aspect, a method is provided. In one embodiment, the method comprises: generating, based at least in part on the multi-party communication transcript data object and using a hybrid space classification machine learning model, a hybrid class for the multi-party communication transcript data object that comprises a primary class for the multi-party communication transcript data object and a secondary class for the multi-party communication transcript data object, wherein: (i) the primary class is selected from a primary classification space, and (ii) the secondary class is selected from a secondary classification space that is distinct from the primary classification space; generating, based at least in part on the hybrid class and using a hybrid-class-based risk scoring machine learning model, a machine-learning-based risk score for the multi-party communication transcript data object; generating, based at least in part on the machine-learning-based risk score and using a hierarchical risk score adjustment workflow, the hierarchical-workflow risk score for the multi-party communication transcript data object, wherein: (i) the hierarchical risk score adjustment workflow is characterized by an ordered sequence of L workflow layers, (ii) each ith non-initial workflow layer is triggered when an (i−1)th workflow layer generates an affirmative workflow determination, (iii) a final workflow layer is configured to generate the hierarchical-workflow risk score, and (iv) the L workflow layers comprise: (a) a first workflow layer that is configured to generate the affirmative workflow determination in response to determining that the machine-learning-based risk score satisfies a machine-learning-based risk score threshold, (b) a second workflow layer that is configured to generate the affirmative workflow determination in response to determining that the multi-party communication transcript data object fails to satisfy one or more targeted exclusion criteria, (c) a third workflow layer that is configured to generate the affirmative workflow determination using one or more historical communication review operations performed with respect to one or more historical multi-party communication transcript data objects that are associated with a predictive entity for the multi-party communication transcript data object, and (d) the final workflow layer that is configured to generate the hierarchical-workflow risk score using one or more entity verification operations performed with respect to the predictive entity that is associated with the multi-party communication transcript data object; and performing one or more prediction-based actions based at least in part on the hierarchical-workflow risk score.

In accordance with another aspect, a computer program product is provided. The computer program product may comprise at least one computer-readable storage medium having computer-readable program code portions stored therein, the computer-readable program code portions comprising executable portions configured to: generate, based at least in part on the multi-party communication transcript data object and using a hybrid space classification machine learning model, a hybrid class for the multi-party communication transcript data object that comprises a primary class for the multi-party communication transcript data object and a secondary class for the multi-party communication transcript data object, wherein: (i) the primary class is selected from a primary classification space, and (ii) the secondary class is selected from a secondary classification space that is distinct from the primary classification space; generate, based at least in part on the hybrid class and using a hybrid-class-based risk scoring machine learning model, a machine-learning-based risk score for the multi-party communication transcript data object; generate, based at least in part on the machine-learning-based risk score and using a hierarchical risk score adjustment workflow, the hierarchical-workflow risk score for the multi-party communication transcript data object, wherein: (i) the hierarchical risk score adjustment workflow is characterized by an ordered sequence of L workflow layers, (ii) each ith non-initial workflow layer is triggered when an (i−1)th workflow layer generates an affirmative workflow determination, (iii) a final workflow layer is configured to generate the hierarchical-workflow risk score, and (iv) the L workflow layers comprise: (a) a first workflow layer that is configured to generate the affirmative workflow determination in response to determining that the machine-learning-based risk score satisfies a machine-learning-based risk score threshold, (b) a second workflow layer that is configured to generate the affirmative workflow determination in response to determining that the multi-party communication transcript data object fails to satisfy one or more targeted exclusion criteria, (c) a third workflow layer that is configured to generate the affirmative workflow determination using one or more historical communication review operations performed with respect to one or more historical multi-party communication transcript data objects that are associated with a predictive entity for the multi-party communication transcript data object, and (d) the final workflow layer that is configured to generate the hierarchical-workflow risk score using one or more entity verification operations performed with respect to the predictive entity that is associated with the multi-party communication transcript data object; and perform one or more prediction-based actions based at least in part on the hierarchical-workflow risk score.

In accordance with yet another aspect, an apparatus comprising at least one processor and at least one memory including computer program code is provided. In one embodiment, the at least one memory and the computer program code may be configured to, with the processor, cause the apparatus to: generate, based at least in part on the multi-party communication transcript data object and using a hybrid space classification machine learning model, a hybrid class for the multi-party communication transcript data object that comprises a primary class for the multi-party communication transcript data object and a secondary class for the multi-party communication transcript data object, wherein: (i) the primary class is selected from a primary classification space, and (ii) the secondary class is selected from a secondary classification space that is distinct from the primary classification space; generate, based at least in part on the hybrid class and using a hybrid-class-based risk scoring machine learning model, a machine-learning-based risk score for the multi-party communication transcript data object; generate, based at least in part on the machine-learning-based risk score and using a hierarchical risk score adjustment workflow, the hierarchical-workflow risk score for the multi-party communication transcript data object, wherein: (i) the hierarchical risk score adjustment workflow is characterized by an ordered sequence of L workflow layers, (ii) each ith non-initial workflow layer is triggered when an (i–1)th workflow layer generates an affirmative workflow determination, (iii) a final workflow layer is configured to generate the hierarchical-workflow risk score, and (iv) the L workflow layers comprise: (a) a first workflow layer that is configured to generate the affirmative workflow determination in response to determining that the machine-learning-based risk score satisfies a machine-learning-based risk score threshold, (b) a second workflow layer that is configured to generate the affirmative workflow determination in response to determining that the multi-party communication transcript data object fails to satisfy one or more targeted exclusion criteria, (c) a third workflow layer that is configured to generate the affirmative workflow determination using one or more historical communication review operations performed with respect to one or more historical multi-party communication transcript data objects that are associated with a predictive entity for the multi-party communication transcript data object, and (d) the final workflow layer that is configured to generate the hierarchical-workflow risk score using one or more entity verification operations performed with respect to the predictive entity that is associated with the multi-party communication transcript data object; and perform one or more prediction-based actions based at least in part on the hierarchical-workflow risk score.

BRIEF DESCRIPTION OF THE SEVERAL VIEWS OF THE DRAWINGS

Reference will now be made to the accompanying drawings, which are not necessarily drawn to scale, and wherein:

FIG. 5 provides an operational example of a portion of a multi-party communication transcript data object in accordance with some embodiments discussed herein.

FIG. 6 provides an operational example of a hybrid classification space for a hybrid classification space machine learning model in accordance with some embodiments discussed herein.

FIG. 11 provides an operational example of a prediction output user interface in accordance with some embodiments discussed herein.

DETAILED DESCRIPTION

Figure 1:
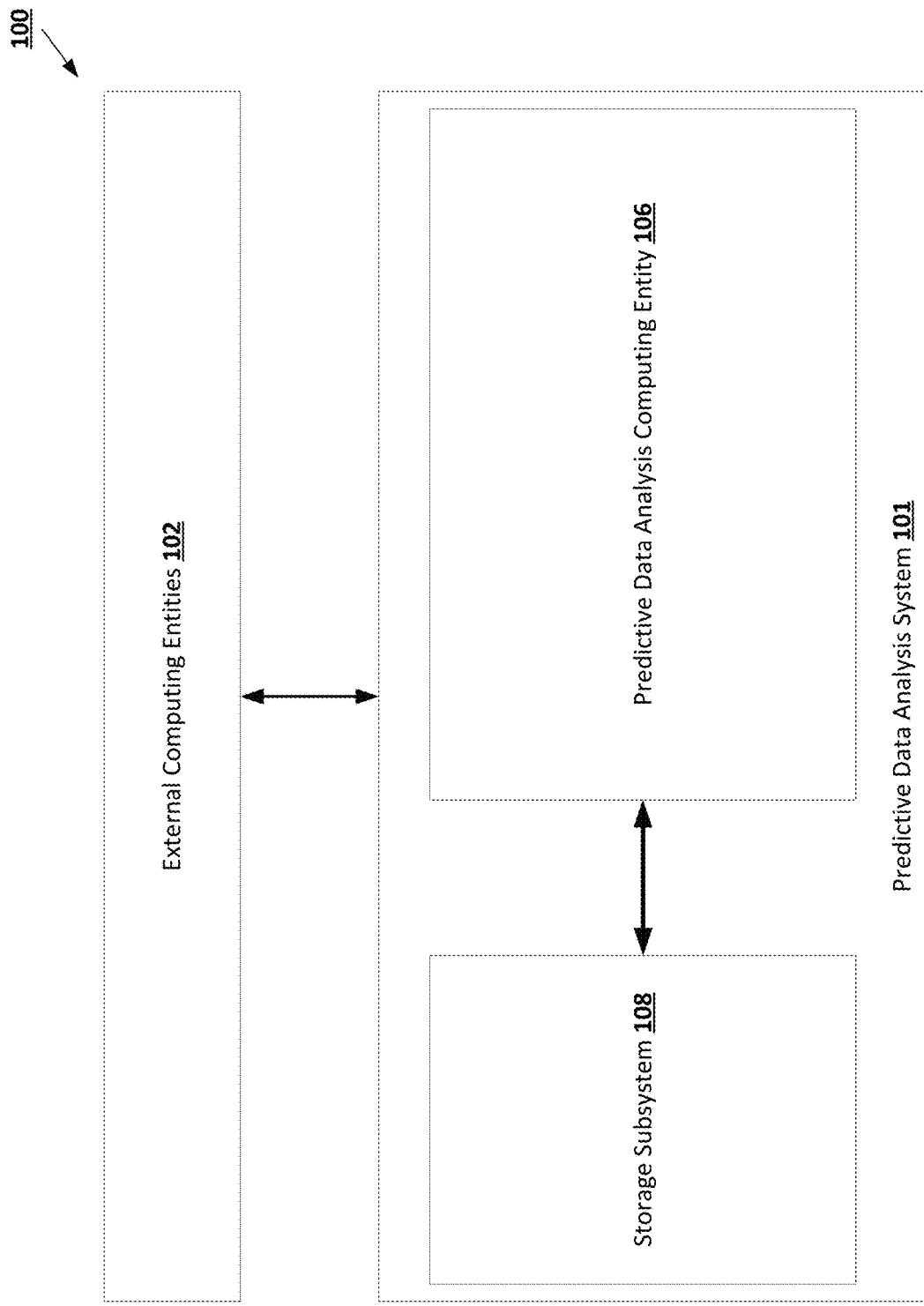
FIG. 1 provides an exemplary overview of an architecture that can be used to practice embodiments of the present invention.

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. OVERVIEW AND TECHNICAL ADVANTAGES

Various embodiments of the present invention disclose techniques for more efficiently and reliably performing predictive data analysis operations. For example, various embodiments of the present invention disclose techniques for performing hierarchical-workflow risk score predictions utilizing one or more supervised machine learning models. For example, according to some embodiments of the present invention, hierarchical-workflow risk score prediction can be performed by: (i) generating, based at least in part on a multi-party communication data object and using a hybrid space classification machine learning model, a hybrid class for the multi-party communication data object; (ii) generating, based at least in part on the hybrid class and using a hybrid-class-based risk scoring machine learning model, a machine-learning-based risk score for the multi-party communication data object; and (iii) generating based at least in part on the machine-learning-based risk score and using a hierarchical risk score adjustment workflow, the hierarchical-workflow risk score for the multi-party communication data object. The hybrid space classification machine learning model and the hybrid-class-based risk scoring machine learning model utilize training data and prediction operations that may, in at least some embodiments, reduce or eliminate the need for computationally expensive training operations in order to generate the machine-learning-based risk score, which in turn is used in generating the hierarchical-workflow risk score. By reducing or eliminating the noted training operations, various embodiments of the present invention: (i) reduce or eliminate the computational operations needed for training and thus improves the computational efficiency of performing hierarchical-workflow risk score predictions, (ii) reduce or eliminate the need for storage resources to train/generate hybrid space classification machine learning models and hybrid-class-based risk scoring machine learning models, and thus improves storage efficiency of performing hierarchical-workflow risk score predictions, and (iii) reduce or eliminate the need for transmitting extensive training data needed to generate hybrid space classification machine learning models and hybrid-class-based risk scoring machine learning models, and thus improves transmission/network efficiency of performing hierarchical-workflow risk score predictions. Via the noted advantages, various embodiments of the present invention make substantial technical contributions to the field of hierarchical-workflow risk score predictive data analysis in particular and healthcare-related predictive data analysis in general.

Moreover, various embodiments of the present invention, include performing one or more false positive and/or deduping operations configured to remove false positives and duplicate processing. Accordingly, various embodiments, of the present invention make important technical contributions by reducing the number of computing entities used in generating the hierarchical-workflow risk score for a multi-party communication data object with respect to the predictive entity and thus perform operational load balancing for the computing entities used in generating the hierarchical-workflow risk score.

An exemplary application of various embodiments of the present invention relate to accurately predicting members (e.g., health insurance plan member) with coordination of benefits (COB) using call transcripts of inbound calls from the members. COB allows two or more insurance plans to work together to pay claims for the same person, when the person is covered by more than one insurer/health insurance provider. COB provides several benefits including avoiding duplicate payments by making sure the two insurance plans do not pay more than the total amount, by establishing which health insurance plan is primary (e.g., the health insurance plan that pays first) and which health insurance plan is secondary (e.g., the health insurance plan that pays the remaining balance after the share of the costs is deducted), and by reducing the cost of insurance premiums. Accordingly, accurately predicting members with COB enables health insurance plan providers (e.g., health insurance companies) to serve its members more efficiently by reducing cycle time for claim payments, validating coverage status, recovering incorrectly paid claims, reducing member repeat calls, and improving customer satisfaction.

Furthermore, various embodiments of the present invention make important technical contributions to improving resource-usage efficiency of post-prediction systems by using predicted hierarchical-workflow risk score for a predictive entity to set the number of allowed computing entities used by the noted post-prediction system and thus perform operational load balancing for the post-prediction systems (e.g., for COB investigation systems that use predicted COB scores as inputs to their investigative operations). For example, in some embodiments, a predictive data analysis computing entity determines D investigation classifications for D predictive entities based at least in part on the D predicted hierarchical-workflow risk scores for the D predictive entities. Then, the count of D predictive entities that are associated with an affirmative investigation classification, along with a resource utilization ratio for each document data object, can be used to predict a predicted number of computing entities needed to perform post-prediction processing operations (e.g., automated investigation operations, such as automated COB investigation operations) with respect to the D predictive entities. For example, in some embodiments, the number of computing entities needed to perform post-prediction processing operations (e.g., automated investigation operations) with respect to D predictive entities can be determined based at least in part on the output of the equation: $R=\text{ceil}(\Sigma_k^{k=K} ur_k)$, where R is the predicted number of computing entities needed to perform post-prediction processing operations with respect to the D predictive entities, ceil(.) is a ceiling function that returns the closest integer that is greater than or equal to the value provided as the input parameter of the ceiling function, k is an index variable that iterates over K predictive entities among the D predictive entities that are associated with affirmative classifications determined based at least in part on predicted hierarchical-workflow risk scores, and $ur_k$ is the estimated resource utilization ratio for a kth predictive entity that may be determined based at least in part on a count of utterances/tokens/words in the kth predictive entity. In some embodiments, once R is generated, a predictive data analysis computing entity can use R to perform operational load balancing for a server system that is configured to perform post-prediction processing operations (e.g., automated investigation operations) with respect to D predictive entities. This may be done by allocating computing entities to the post-prediction processing operations if the number of currently-allocated computing entities is below R, and deallocating currently-allocated computing entities if the number of currently-allocated computing entities is above R.

II. DEFINITIONS OF CERTAIN TERMS

The term "multi-party communication transcript data object" may refer to a data object that comprises text data describing communications between two or more parties during a particular communication session (e.g., during a particular call, during a particular videoconference, during a particular text messaging session, and/or the like). An example of a multi-party communication transcript data object is a data object comprising communications between a call center agent party and a call center requester party. Accordingly, a multi-party communication transcript data object may be associated with an inbound communication data object, such as a phone call by a health insurance member (e.g., call center requester party) to a health insurance plan provider call center, where the phone call may be received by a call center agent. In some embodiments, the multi-party communication transcript data object may be generated by performing text-to-speech transformation/conversion operations on an audio file containing audio data associated with a call between two parties such as the call center agent party and the call center service requester party, in the noted example above. In some embodiments, the multi-party communication transcript data object may be an inbound multi-party communication transcript data object that is initiated, for example, by a call center service requester.

The term "hierarchical-workflow risk score" may refer to a data construct that describes a likelihood that a predictive entity (e.g., individual, business entity, health insurance plan member, and/or the like) is associated with an event of interest such as COB based at least in part on a multi-party communication transcript data object associated with the predictive entity. For example, in some embodiments, the hierarchical-workflow risk score may describe the likelihood that a member (e.g., health insurance plan member) has coordination of benefits based at least in part on a call transcript that is generated based at least in part on communications between an agent party and the member predictive entity. In some embodiments, the hierarchical-workflow risk score may be generated based at least in part on a machine-learning-based risk score and utilizing a hierarchical risk score adjustment workflow. In some embodiments, the hierarchical risk score adjustment workflow is characterized by an ordered sequence of L workflow layers, (i) each ith non-initial workflow layer is triggered when an (i−1)th workflow layer generates an affirmative workflow determination, (ii) a final workflow layer is configured to generate the hierarchical-workflow risk score, and (iii) the L workflow layers comprise: (a) a first workflow layer that is configured to generate the affirmative workflow determination in response to determining that the machine-learning-based risk score satisfies a machine-learning-based risk score threshold, (b) a second workflow layer that is configured to generate the affirmative workflow determination in response to determining that the multi-party communication transcript data object fails to satisfy one or more targeted exclusion criteria, (c) a third workflow layer that is configured to generate the affirmative workflow determination using one or more historical communication review operations performed with respect to one or more historical multi-party communication transcript data objects that are associated with a predictive entity for the multi-party communication transcript data object, and (d) the final workflow layer that is configured to generate the hierarchical-workflow risk score using one or more entity verification operations performed with respect to the predictive entity that is associated with the multi-party communication transcript data object.

The term "hybrid class" may refer to a data construct that describes a class/category for a multi-party communication transcript data object that is generated based at least in part on two or more underlying predicted classes for the multi-party communication transcript data object, such as a primary class that describes a top-level reason code for the multi-party communication transcript data object and a secondary class that describes a bottom-level additional context code for the multi-party communication transcript data object. However, while various embodiments of the present invention describe generating hierarchical-workflow risk score for a multi-party communication transcript data object based at least in part on hybrid classes, a person of ordinary skill in the relevant technology will recognize that, in some embodiments, a hierarchical-workflow risk score for a multi-party communication transcript data object may be generated based at least in part on a non-hybrid class for the multi-party communication transcript data object that is generated based at least in part on only one underlying predicted class for the multi-party transcript communication data object.

In some embodiments, a hybrid class describes an assigned class/category for a multi-party communication transcript data object that is determined based at least in part on C underlying predicted class for the multi-party communication transcript data object, wherein C may be a value that is defined by configuration hyperparameters of a hybrid space classification machine learning model that is used to generate hybrid classes for input multi-party communication transcript data objects. For example, when C=2, then the hybrid class for a multi-party communication transcript data object may be determined (e.g., may be a pair comprising) for a primary class for the multi-party communication transcript data object (e.g., a primary class that describes a top-level call reason code for the multi-party communication transcript data object) and a secondary class for the multi-party communication transcript data object (e.g., a secondary class that describes a bottom-level additional context code for the multi-party communication transcript data object). In some embodiments, the primary class is selected from a primary classification space and the secondary class is selected from a secondary classification space that is distinct from the primary classification space.

The term "hybrid classification space" may refer to a data construct that describes a set of all hybrid classes that may be assigned to a multi-party communication transcript data object. In some embodiments, the number of hybrid classes defined by a hybrid classification space describes how many cross-level hierarchical dependencies exist between the C classification levels associated with the hybrid classification space. In some embodiments, given a set of C independent and non-hierarchical classification levels associated with a hybrid classification space, where each cth classification level is associated with a cth-level classification schema that defines $N_c$ cth-level classes that may be assigned to multi-party communication transcript data objects as selected/assigned cth-level classes, then the hybrid classification space defines/comprises $\Pi_{i=1}^{c} N_c$. For example, given C=2, where the first-level classification schema comprises two top-level reason codes R1 and R2 and the second-level classification schema comprises four bottom-level additional context codes A1, A2, A3, and A4, then the hybrid class comprises the following 2*4=8 hybrid classes: a hybrid class corresponding to the ordered pair (R1, A1), a hybrid class corresponding to the ordered pair (R1, A2), a hybrid class corresponding to the ordered pair (R1, A3), a hybrid class corresponding to the ordered pair (R1, A4), a hybrid class corresponding to the ordered pair (R2, A1), a hybrid class corresponding to the ordered pair (R2, A2), a hybrid class corresponding to the ordered pair (R2, A3), and a hybrid class corresponding to the ordered pair (R2, A4). However, if there are hierarchical dependency relationships between the C classification levels associated with a hybrid classification space, such that for example the assigned/selected cth-level class for a multi-party communication transcript data object can be used to generate/filter/select an applicable (c+1)th-level classification space for the multi-party communication transcript data object that comprises less than all of the defined candidate (c+1)th-level classes in the (c+1)th-level classification schema, then the hybrid classification space defines/comprises less than $\Pi_{i=1}^{c} N_c$ defined hybrid classes, where each $N_c$ value is the count of cth-level underlying classes defined by the cth-level classification schema for a cth classification level associated with the hybrid classification space. For example, given C=2, where the first-level classification schema comprises two top-level reason codes R1 and R2 and the second-level classification schema comprises four bottom-level additional context codes A1, A2, A3, and A4, if A1 and A2 can only be assigned to a multi-party communication transcript data object if R1 is already assigned to the multi-party communication transcript data object, and further if A3 and A4 can only be assigned to a multi-party communication transcript data object if R1 is already assigned to the multi-party communication transcript data object, then the hybrid classification space comprises the following four hybrid class: a hybrid class corresponding to the ordered pair (R1, A1), a hybrid class corresponding to the ordered pair (R1, A2), a hybrid class corresponding to the ordered pair (R2, A3), and a hybrid class corresponding to the ordered pair (R2, A4).

The term "hybrid classification space machine learning model" may refer to a data construct that describes a machine learning model that is configured to generate, for an input multi-party communication transcript data object, a hybrid class that is selected from a hybrid classification space for the hybrid classification machine learning model, where the hybrid classification space comprises a primary classification space and a secondary classification space. In some embodiments, the hybrid classification space machine learning model comprises an encoding layer (e.g., an attention-based encoding layer) and a classification layer, where the encoding layer is configured to process the input multi-party communication transcript data object to generate a fixed-size embedded representation of the multi-party communication transcript data object, while the classification layer is configured to process the fixed-size embedded representation of the multi-party communication transcript data object to map the multi-party communication transcript data object to a mapped hybrid class defined by the hybrid classification space. An example of a hybrid classification space machine learning model is the AI Call Center Agent (ACC) machine learning model. In some embodiments, the hybrid classification space for a hybrid classification space machine learning model is provided as configuration hyperparameter data for the noted hybrid classification space machine learning model. In some embodiments, inputs to a hybrid classification space machine learning model comprise, for a given input multi-party communication transcript data object, a file containing text data associated with the given input multi-party communication transcript data object, and/or a vector containing an initial representation (e.g., a one-hot-coded representation, a bag-of-words representation, a Paragraph2Vec representation, and/or the like) of the given input multi-party communication transcript data object. In some embodiments, outputs of a hybrid classification space machine learning model comprise, for a given input multi-party communication transcript data object, C vectors, where each cth vector is associated with a respective cth classification level, has the size Nc which describes the number of cth-level classes defined by the cth-level classification schema for the respective cth classification level, and describes, for each cth-level class defined by the cth-level classification schema, a predicted likelihood that the given input multi-party communication transcript data object should be assigned the particular cth level class. In some embodiments, the hybrid classification space machine learning model is trained using ground-truth hybrid classes for a historical multi-party communication transcript data object, such as ground-truth hybrid classes defined by a subject matter expert (SME) and/or by a superior hybrid space classification machine learning model whose operational computational complexity is higher than the operational computational complexity of the hybrid space classification machine learning model for which ground-truth training data is being generated.

The term "hybrid-class-based risk scoring machine learning model" may refer to a data construct that is configured to describe parameters, hyper parameters, and/or stored operations of a machine learning model (e.g., a classification machine learning model) that is configured to generate a machine-learning-based risk score (e.g. initial risk score) for a predictive entity associated with a multi-party communication transcript data object based at least in part on the hybrid class for the multi-party communication transcript data object for the predictive entity. In some embodiments, the hybrid-class-based risk scoring machine learning model is a trained classification model that utilizes embeddings generating using NLP processing techniques. The hybrid-class-based risk scoring machine learning model may be a binary classification machine learning model. In some embodiments, the hybrid-class-based risk scoring machine learning model may be a multi-class classification machine learning model. For example, the machine-learning-based risk score generated by the hybrid-class-based risk scoring machine learning model may be either a binary value of 0 or 1, where 0 corresponds to a determination that a predictive entity is associated with the event-of-interest, such as COB. As another example, the machine-learning-based risk score generated by the hybrid-class-based risk scoring machine learning model may be a classification label such as "affirmative COB", "negative COB", "undetermined", and/or the like. In some embodiments, inputs to the hybrid-class-based risk scoring machine learning model comprise a vector, while outputs of the hybrid-class-based risk scoring machine learning model may comprise a vector and/or an atomic value describing a predicted machine-learning-based risk score.

The term "coordination of benefits" may refer to a scenario in which a member of a health insurance company has additional coverage elsewhere. The additional coverage may be another commercial health insurance company or with a government program (e.g., Medicare or Medicaid). Coordination of benefits enables insurance companies to determine/identify primary insurers, avoid duplicate payments, and reduce the cost of insurance premiums.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DINIM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like, executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis computing system 101 configured to receive predictive data analysis requests from external computing entities 102, process the predictive data analysis requests to generate predictions corresponding to the predictive data analysis requests, provide the generated predictions to the external computing entities 102, and automatically perform prediction-based actions based at least in part on the generated predictions. An example of a prediction-based action that can be performed using the predictive data analysis computing system 101 is a request for generating a hierarchical-workflow risk score for a call transcript document that is indicative of a COB risk score with respect to the predictive entity (e.g., a health insurance plan member) associated with the call transcript document.

In some embodiments, the predictive data analysis computing system 101 may communicate with at least one of the external computing entities 102 using one or more communication networks. Examples of communication networks include any wired or wireless communication networks including, for example, a wired or wireless local area network (LAN), personal area network (PAN), metropolitan area network (MAN), wide area network (WAN), or the like, as well as any hardware, software, and/or firmware required to implement it (such as, e.g., network routers, and/or the like).

The predictive data analysis computing system 101 may include a predictive data analysis computing entity 106 and a storage subsystem 108. The predictive data analysis computing entity 106 may be configured to receive predictive data analysis requests from one or more external computing entities 102, process the predictive data analysis requests to generate predictions corresponding to the predictive data analysis requests, provide the generated predictions to the external computing entities 102, and automatically perform prediction-based actions based at least in part on the generated predictions.

The storage subsystem 108 may be configured to store input data used by the predictive data analysis computing entity 106 to perform predictive data analysis predictions, as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

Figure 2:
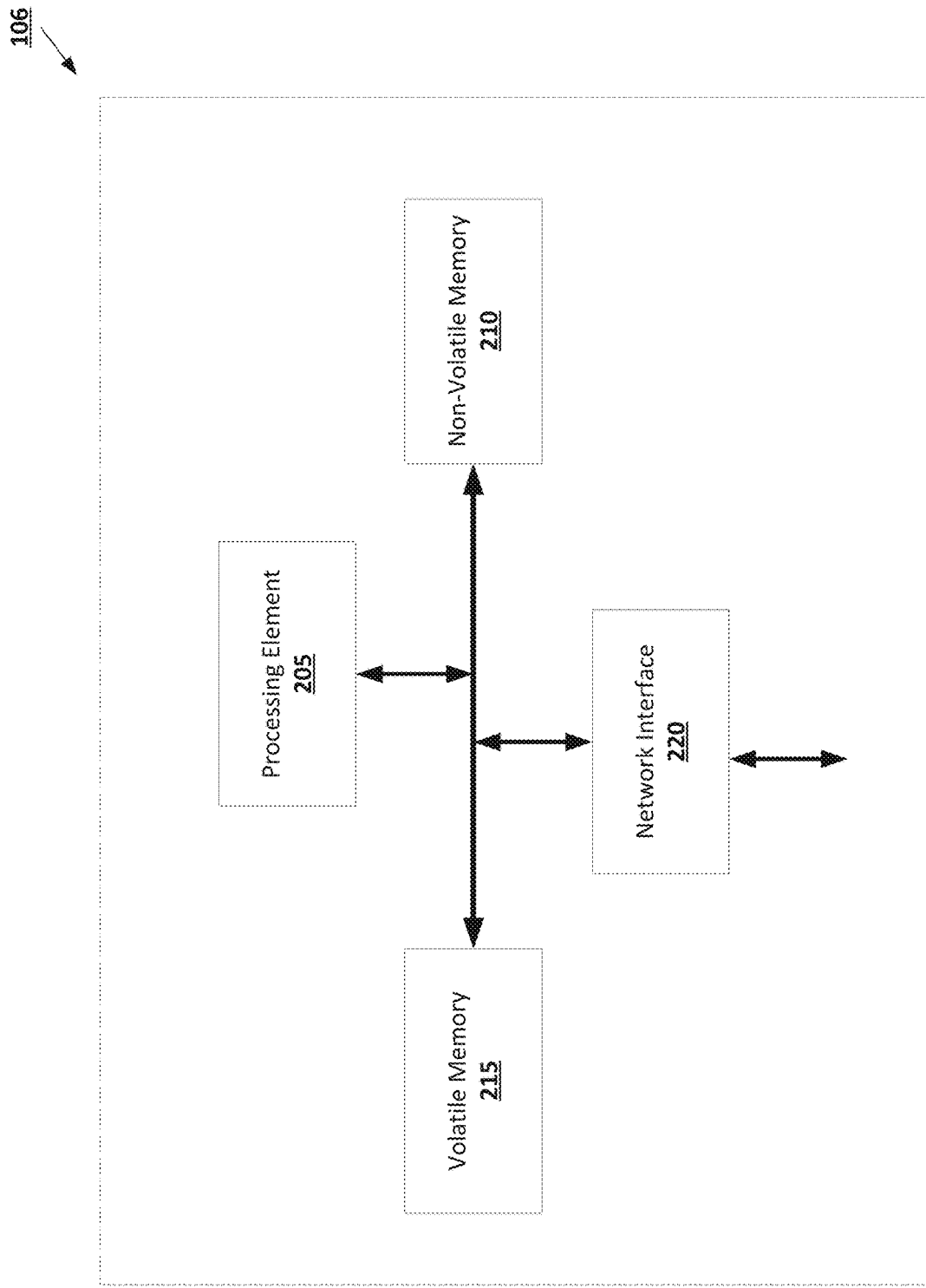
FIG. 2 provides an example predictive data analysis computing entity in accordance with some embodiments discussed herein.

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry, and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry, and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary External Computing Entity

Figure 3:
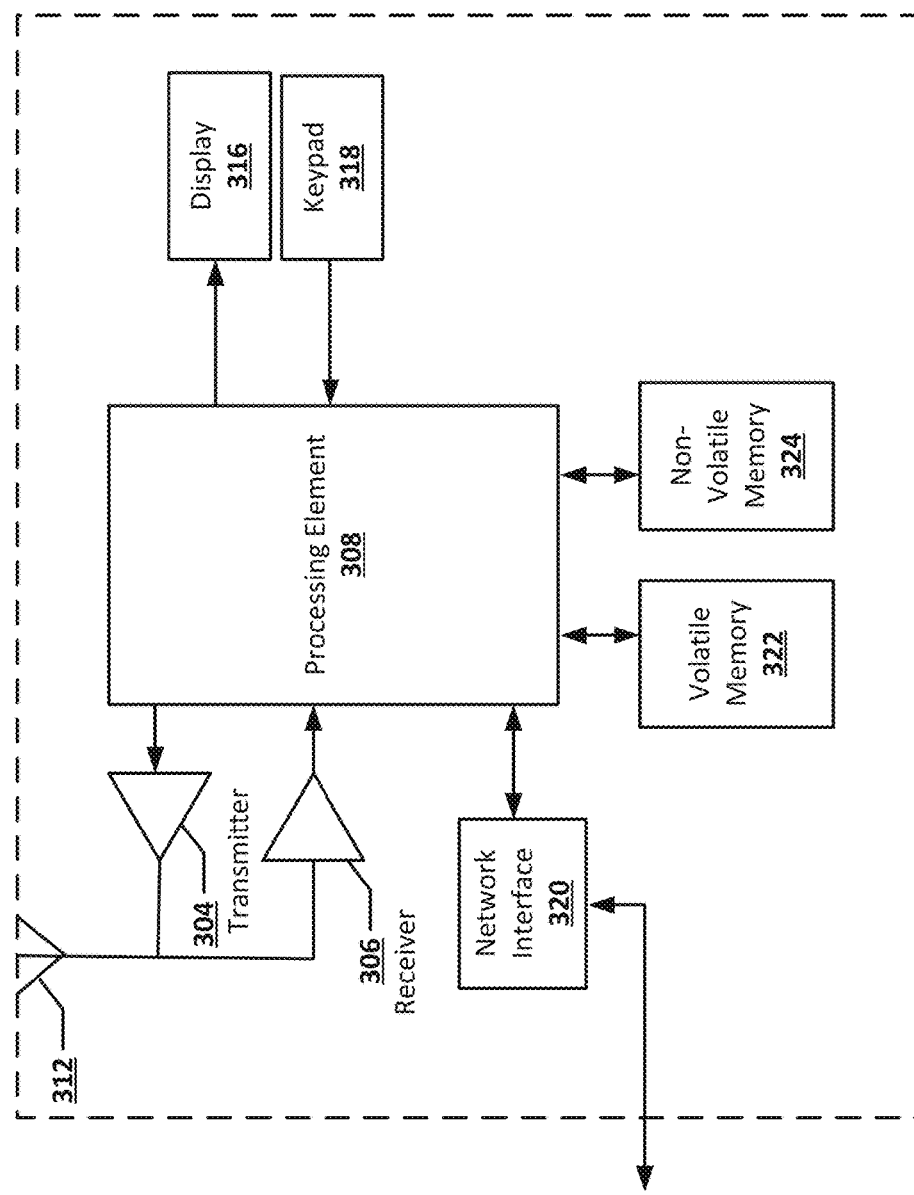
FIG. 3 provides an example external computing entity in accordance with some embodiments discussed herein.

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts, such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies, including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102, and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionalities that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

As described below, various embodiments of the present invention make important technical contributions to improving resource-usage efficiency of post-prediction systems by using predicted hierarchical-workflow risk scores for predictive entities to set the number of allowed computing entities used by the noted post-prediction system and thus perform operational load balancing for the post-prediction systems (e.g., for COB investigation systems that use predicted COB scores as inputs to their investigative operations). For example, in some embodiments, a predictive data analysis computing entity determines D investigation classifications for D predictive entities based at least in part on the D predicted hierarchical-workflow risk scores for the D predictive entities. Then, the count of D predictive entities that are associated with an affirmative investigation classification, along with a resource utilization ratio for each document data object, can be used to predict a predicted number of computing entities needed to perform post-prediction processing operations (e.g., automated investigation operations, such as automated COB investigation operations) with respect to the D predictive entities. For example, in some embodiments, the number of computing entities needed to perform post-prediction processing operations (e.g., automated investigation operations) with respect to D predictive entities can be determined based at least in part on the output of the equation: $R=\text{ceil}(\Sigma_k^{k=K} ur_k)$, where R is the predicted number of computing entities needed to perform post-prediction processing operations with respect to the D predictive entities, cello) is a ceiling function that returns the closest integer that is greater than or equal to the value provided as the input parameter of the ceiling function, k is an index variable that iterates over K predictive entities among the D predictive entities that are associated with affirmative classifications determined based at least in part on predicted hierarchical-workflow risk scores, and $ur_k$ is the estimated resource utilization ratio for a kth predictive entity that may be determined based at least in part on a count of utterances/tokens/words in the kth predictive entity. In some embodiments, once R is generated, a predictive data analysis computing entity can use R to perform operational load balancing for a server system that is configured to perform post-prediction processing operations (e.g., automated investigation operations) with respect to D predictive entities. This may be done by allocating computing entities to the post-prediction processing operations if the number of currently-allocated computing entities is below R, and deallocating currently-allocated computing entities if the number of currently-allocated computing entities is above R.

Figure 4:
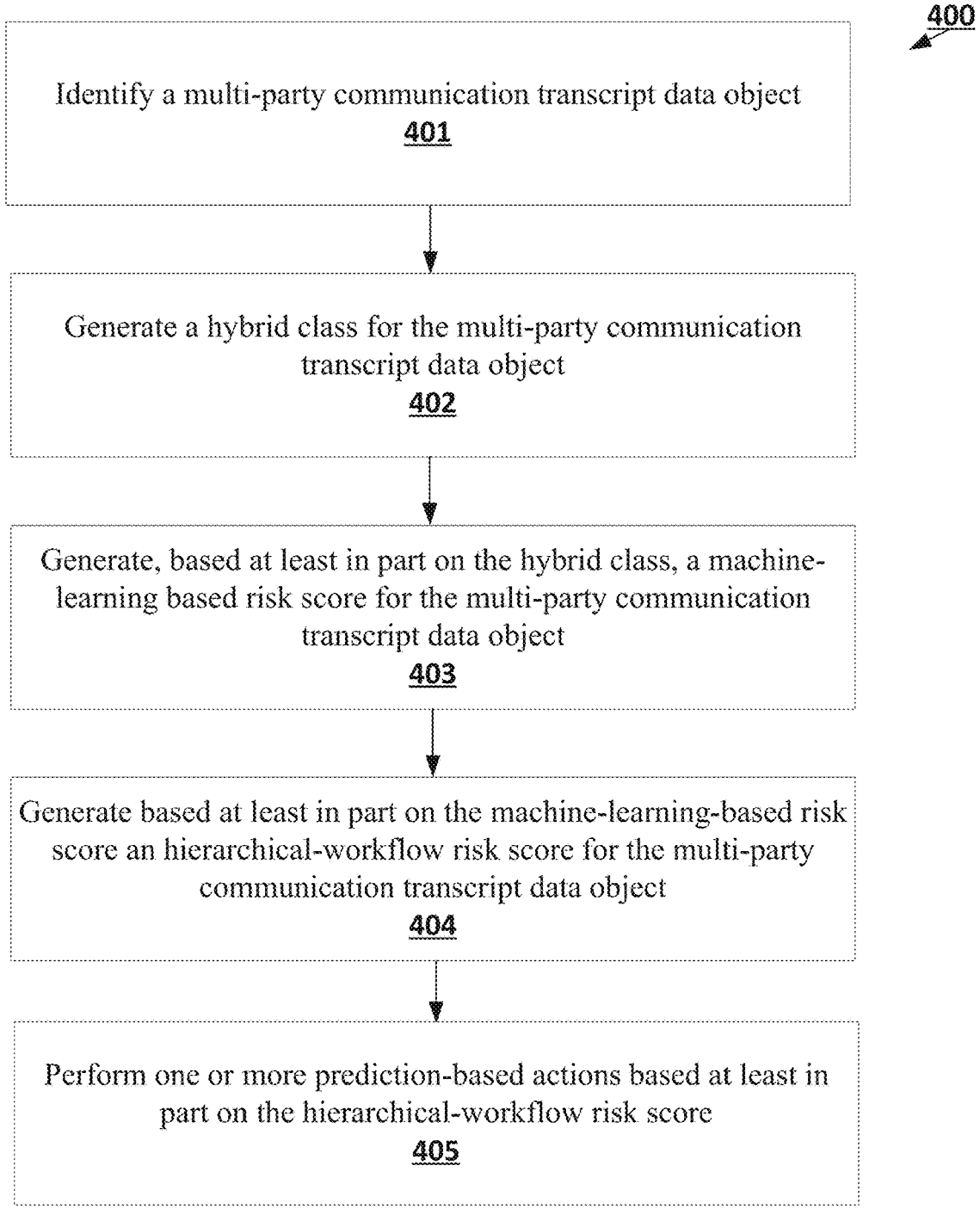
FIG. 4 provides a flowchart diagram of an example process for generating a hierarchical-workflow risk score for a multi-party communication transcript data object in accordance with some embodiments discussed herein.

FIG. 4 provides a flowchart diagram of an example process 400 for generating a hierarchical-workflow risk score with respect to a predictive entity using a multi-party communication transcript data object associated with the predictive entity, where a hierarchical-workflow risk score may describe a likelihood that the predictive entity is associated with an event-of-interest such as COB. Via the various steps/operations of the process 400, the predictive data analysis computing entity 106 can generate a hierarchical-workflow risk score for a multi-party communication transcript data object with respect to a predictive entity based at least in part on a machine-learning-based risk score and utilizing a hierarchical risk score adjustment workflow (described further herein).

The process 400 begins at step/operation 401 when the predictive data analysis computing entity 106 identifies (e.g., retrieves, receives, generates, and/or the like) a multi-party communication transcript data object associated with a predictive entity of a plurality of predictive entities. In various embodiments, the predictive data analysis computing entity 106 is configured to generate for a plurality of predictive entities a hierarchical-workflow risk score for the predictive entity using one or more multi-party communication transcript data object associated with the predictive entity within a defined period (e.g., last 3 months, last 6 months, last 8 months, and/or the like). For example, each multi-party communication transcript data object may be associated with a timestamp that represents the occurrence of the underlying communication with respect to which the multi-party communication transcript data object was generated. A multi-party communication transcript data object describes a transcript of a communication between two parties and may be associated with a timestamp, as describe above. In some embodiments, identifying a multi-party communication transcript data object comprises identifying the multi-party communication transcript data object based at least in part on a multi-party audio data object. For example, in some embodiments, the predictive data analysis computing entity 106 receives a multi-party audio data object as an audio file from an audio storage server system and generates the corresponding multi-party communication transcript data object by performing one or more text-to-speech transformation/conversion operations on the received multi-party communication audio data object. In some embodiments, identifying a multi-party communication transcript data object comprises receiving the multi-party communication transcript data object from one or more computing entities. For example, in some embodiments, the predictive data analysis computing entity 106 receives the multi-party communication transcript data object from external computing entity 102. In some embodiments, identifying a multi-party communication transcript data object comprises receiving the multi-party communication transcript data object from a storage server system. For example, in some embodiments, the predictive data analysis computing entity 106 receives the multi-party communication transcript data object as a text file from a storage server system (e.g., a transcript storage server system). In some embodiments, the predictive data analysis computing entity 106 retrieves the multi-party communication transcript data object from a local storage medium that is associated with the predictive data analysis computing entity 106, such as from the storage subsystem 108 of the predictive data analysis system 101.

In some embodiments, the multi-party communication transcript data object comprises text data describing communications between two or more parties during a particular communication session (e.g., during a particular call, a particular videoconference, a particular text messaging session, and/or the like). An operational example of a portion of a multi-party communication transcript data object 500 is depicted in FIG. 5. As depicted in FIG. 5, the multi-party communication transcript data object 500 comprises communications between a call center agent party and a call center service requester party. In some embodiments, the multi-party communication transcript data object 500 may be generated by performing text-to-speech transformation/conversion operations on an audio file containing audio data associated with a call between the call center agent and the call center service requester party.

Returning to FIG. 4, at step/operation 402 the predictive data analysis computing entity 106 generates a hybrid class for the multi-party communication transcript data object, where a hybrid class for a multi-party communication transcript data object may be a class/category for the particular multi-party communication transcript data object that is generated based at least in part on two or more underlying predicted classes for the multi-party communication transcript data object, such as a primary class that describes a top-level reason code for the multi-party communication transcript data object and is selected from a primary classification space and a secondary class that describes a bottom-level additional context code for the multi-party communication transcript data object and is selected from a secondary classification space that is distinct from the primary classification space. For example, the primary classification space may comprise a plurality of defined primary classes, and each defined primary class may be associated with a respective distinct secondary classification space that comprises one or more sub-classes of the defined primary class. However, while various embodiments of the present invention describe using techniques of the process 400 to generate a hierarchical-workflow risk score for multi-party communication transcript data objects, a person of ordinary skill in the relevant technology will recognize that the disclosed techniques can be used to generate hierarchical-workflow risk scores for other non-transcript document data objects, such as for document data objects that describe text data associated with medical documents, contract documents, tutorial documents, and/or the like.

In some embodiments, the hybrid class for a multi-party communication transcript data object is a C-sized tuple comprising C values, where each cth value of the C values describes a cth-level predicted underlying class for the multi-party communication transcript data object that is selected from a c-th level classification space describing a set of defined candidate c-th levels that may be assigned to a particular multi-party communication transcript data object. For example, given C=2, the first-level classification space may define a set of candidate top-level reason codes that may be assigned to the multi-party communication transcript data objects, the second-level classification space may define a set of candidate bottom-level additional contexts that may be assigned to the multi-party communication transcript data objects, and the hybrid class for a particular multi-party communication transcript data object is a 2-sized tuple (i.e., an ordered pair), where the first value of the 2-sized tuple describes a selected candidate top-level reason code from the first-level classification space that is assigned to the particular multi-party communication transcript data object, and the second value of the 2-sized tuple describes a selected bottom-level additional context code from the second-level classification space that is assigned to the particular multi-party communication transcript data object.

In some embodiments, the hybrid class for a multi-party communication transcript data object is selected from a hybrid classification space that describes a set of all hybrid classes that may be assigned to multi-party communication transcript data object. In some embodiments, the number of hybrid classes defined by a hybrid classification space describes how many cross-level hierarchical dependencies exist between the C classification levels associated with the hybrid classification space. In some embodiments, given a set of C independent and non-hierarchical classification levels associated with a hybrid classification space, where each cth classification level is associated with a cth-level classification schema that defines $N_c$ cth-level classes that may be assigned to multi-party communication transcript data objects as selected/assigned cth-level classes, then the hybrid classification space defines/comprises $\Pi_{i=1}^{C} N_c$. For example, given C=2, where the first-level classification schema comprises two top-level reason codes R1 and R2 and the second-level classification schema comprises four bottom-level additional context codes A1, A2, A3, and A4, then the hybrid class comprises the following 2*4=8 hybrid classes: a hybrid class corresponding to the ordered pair (R1, A1), a hybrid class corresponding to the ordered pair (R1, A2), a hybrid class corresponding to the ordered pair (R1, A3), a hybrid class corresponding to the ordered pair (R1, A4), a hybrid class corresponding to the ordered pair (R2, A1), a hybrid class corresponding to the ordered pair (R2, A2), a hybrid class corresponding to the ordered pair (R2, A3), and a hybrid class corresponding to the ordered pair (R2, A4).

In some embodiments, given C=2, a corresponding hybrid classification space comprises a primary classification space associated with a first classification level and a secondary classification space associated with a second classification level. If the relationship between the two classification levels is hierarchically-dependent such that the first classification level is the hierarchical parent/superior of the second classification level, then each primary class is associated with a respective secondary classification space that defines a set of defined secondary classes that are assigned to a particular multi-party communication transcript data object if the particular primary class is already assigned to the particular multi-party communication transcript. FIG. 6 depicts an operational example of a hybrid classification space according to some embodiments of the present invention.

In some embodiments, the hybrid class for a multi-party communication transcript data object may be generated by a hybrid classification space machine learning model. In some embodiments, a hybrid classification space machine learning model is configured to generate, for an input multi-party communication transcript data object, a hybrid class that is selected from a hybrid classification space for the hybrid classification machine learning model. In some embodiments, the hybrid classification space machine learning model comprises an encoding layer (e.g., an attention-based encoding layer) and a classification layer, where the encoding layer is configured to process the input multi-party communication transcript data object to generate a fixed-size embedded representation of the multi-party communication transcript data object, while the classification layer is configured to process the fixed-size embedded representation of the multi-party communication transcript data object to map the multi-party communication transcript data object to a mapped hybrid class defined by the hybrid classification space. An example of a hybrid classification space machine learning model is the AI Call Center Agent (ACC) machine learning model. In some embodiments, the hybrid classification space for a hybrid classification space machine learning model is provided as configuration hyperparameter data for the noted hybrid classification space machine learning model.

In some embodiments, inputs to a hybrid classification space machine learning model comprise, for a given input multi-party communication transcript data object, a file containing text data associated with the given input multi-party communication transcript data object, and/or a vector containing an initial representation (e.g., a one-hot-coded representation, a bag-of-words representation, a Paragraph2Vec representation, and/or the like) of the given input multi-party communication transcript data object. In some embodiments, outputs of a hybrid classification space machine learning model comprise, for a given input multi-party communication transcript data object, C vectors, where each cth vector is associated with a respective cth classification level, has the size $N_c$ which describes the number of cth-level classes defined by the cth-level classification schema for the respective cth classification level, and describes, for each cth-level class defined by the cth-level classification schema, a predicted likelihood that the given input multi-party communication transcript data object should be assigned the particular cth level class. In some embodiments, the hybrid classification space machine learning model is trained using ground-truth hybrid classes for historical multi-party communication transcript data objects, such as ground-truth hybrid classes defined by a subject matter expert and/or by a superior hybrid space classification machine learning model whose operational computational complexity is higher than the operational computational complexity of the hybrid space classification machine learning model for which ground-truth training data is being generated.

Returning to FIG. 4, at step/operation 403, the predictive data analysis computing entity 106 generates, based at least on the hybrid class for the multi-party communication transcript data object and utilizing a hybrid-class-based risk scoring machine learning model, a machine-learning-based risk score for the multi-party communication transcript data object. In various embodiments, the predictive data analysis computing entity 106 is configured to generate a hybrid-class-based risk scoring machine learning model for each predictive entity of a plurality of predictive entities. In various embodiments, the predictive input entity 106 is configured to rank each predictive entity of the plurality of predictive entities based at least in part on each machine-learning-based risk score associated with the predictive entities. The machine-learning-based risk score may describe the likelihood that the predictive entity associated with the multi-party communication transcript data object is associated with an event-of-interest, such as COB.

As an operational example, the predictive data analysis computing entity 106 may be configured to generate, based at least in part on the hybrid class for a multi-party communication transcript data object and by utilizing a hybrid-class-based risk scoring machine learning model, a machine-learning-based risk score that describes the likelihood that the member associated with the multi-party communication transcript data object (e.g., health insurance plan member that called an agent of a health insurance plan provider call center) has COB. In some embodiments, the machine-learning-based risk score may be an initial risk score for the multi-party communication transcript data object, that is in turn used to determine a hierarchical-workflow risk score (described further herein) for the multi-party communication transcript data object.

The hybrid-class-based risk scoring machine learning model may be configured to generate the machine-learning-based risk score for a multi-party communication transcript data object based at least in part on input features that comprise one or more of: (i) the input hybrid class for the multi-party communication transcript data object, (ii) a predesignated label for the multi-party communication transcript data object, or (iii) a keyword occurrence data object for the multi-party communication transcript data object. In some embodiments, the hybrid-class-based risk scoring machine learning model generates the machine-learning-based risk score for a multi-party communication transcript data object based at least in part on input features that comprise: (i) the input hybrid class for the multi-party communication transcript data object, (ii) a predesignated label for the multi-party communication transcript data object; and (iii) a keyword occurrence data object for the multi-party communication transcript data object if the multi-party communication transcript data object is associated with a keyword occurrence data object.

A predesignated label for a multi-party communication transcript data object may be a class/category (e.g., high-level call reason class/category, topic class/category, and/or the like) of a plurality of class/categories that is assigned to the multi-party communication transcript data object and is generated/determined using one or more techniques that may not comprise utilizing the hybrid space classification machine learning model. In some embodiments, the predesignated label for a multi-party communication transcript data object may be a selected class/category from a set of classes/categories, such as a class/category selected by a call center agent party associated with the multi-party communication transcript data object (e.g., the call center agent party of the corresponding inbound call between the call center agent party and the call center service requester party/predictive entity with respect to which the multi-party communication transcript data object was generated).

For example, consider where the multi-party communication transcript data object is a call transcript data object of a particular communication between a health insurance plan member and an agent of the health insurance plan provider. In the noted example, the predesignated label may be generated when the call center agent selects (e.g., during the call or soon after the call) a class/category for the multi-party communication transcript data object from a list of classes/categories (e.g., displayed on a user interface of a computing entity being used by the call center agent). Additionally or alternatively, in some embodiments, the predesignated label for a multi-party communication transcript data object may be generated by a machine learning model whose operational complexity may be higher than, lower than, or the same as the operational complexity of the hybrid space classification machine learning model. In some embodiments, the predesignated label may comprise a single class/category such as a single call reason. In some embodiments, the predesignated label may additionally comprise one or more sub-classes/sub-categories.

A keyword occurrence data object may describe occurrences of a keyword schema (e.g., a word, a phrase, and/or the like) in the multi-party communication transcript data object, where the keyword occurrence data object may comprise a subset of the keywords and/or phrases in a keyword repository. Accordingly, in some embodiments, a multi-party communication transcript data object may be associated with a keyword occurrence data object based at least in part on whether the particular multi-party communication transcript data object comprises one or more keywords in the keyword repository. For example, a particular multi-party communication transcript data object may include one or more keywords and/or phrases that is in the keyword repository, and thus be associated with a keyword occurrence data object comprising the corresponding one or more keywords present in the particular multi-party communication transcript data object.

As another example, a particular multi-party communication transcript data object may not include any of the keywords and/or phrases in the keyword repository, and thus not be associated with a keyword occurrence data object. A keyword repository may comprise keywords and/or phrases that are deemed important for determining the likelihood of an event-of-interest with respect to a predictive entity. For example, where the event-of-interest is COB, the keyword repository may comprise keywords and/or phrases that are deemed important for determining the likelihood that a member (e.g., health insurance plan member) has COB, such as "coordination of benefits," "worked for federal government or municipality union," "certificate of coverage," "auto accident," "compensation benefit," "covered on the plan," "federal insurance contributions act," keywords/phrases that are related to Medicare, Medicaid, spouse insurance, parent child, employment, medical payment coverage, and/or the like.

In some embodiments, to generate the machine-learning-based risk score for the multi-party communication transcript data object, the predictive data analysis computing entity 106 performs the following operations: (i) identifies, using the hybrid-class-based risk scoring machine learning model, the hybrid class for the multi-party communication transcript data object, the predesignated label for the multi-party communication transcript data object, and a keyword occurrence data object for the multi-party communication transcript data object if the multi-party communication transcript data object is associated with a keyword occurrence data object; and (ii) provides as input features to the hybrid-class-based risk scoring machine learning model the hybrid class for the multi-party communication transcript data object, the predesignated label for the multi-party communication transcript data object, and a keyword occurrence data object for the multi-party communication transcript data object (if the multi-party communication transcript data object is associated with a keyword occurrence data object) to generate the machine-learning-based risk score for the multi-party communication transcript data object.

In some embodiments, identifying the hybrid class for the multi-party communication transcript data object comprises receiving and/or retrieving as output from the hybrid space classification model the hybrid class for the multi-party communication transcript data object. In some embodiments, identifying the predesignated label for the multi-party communication transcript data object comprises retrieving the predesignated label from a predesignated label storage server system. In some embodiments, identifying the predesignated label for a multi-party communication transcript data object comprises retrieving the predesignated label from a local storage medium that is associated with the predictive data analysis computing entity 106, such as from the storage subsystem 108 of the predictive data analysis system 101.

In some embodiments, to identify the keyword occurrence data objects for a multi-party communication transcript data object, the predictive data analysis computing entity 106, utilizing one or more keyword extraction techniques (e.g., regular expression technique, and/or the like), extracts keywords and/or phrases (if any) that are in the keyword repository and present in the multi-party communication transcript data object, and generates the keyword occurrence data object based at least in part on the extracted keywords, where the keyword occurrence data object may be a vector representation of the extracted keywords and/or phrases. For example, in some embodiments, the predictive data analysis computing may be configured to generate a vector representation of the extracted keyword before providing as input to the hybrid-class-based risk scoring machine learning model.

In some embodiments, to generate the keyword repository, the following operations are performed: (i) receiving and/or retrieving a set of historical multi-party communication transcript data objects; (ii) generating, for each historical multi-party communication transcript data object in the set of historical multi-party communication transcript data objects and utilizing a hybrid space classification model, a hybrid class for the historical multi-party communication transcript data object; (iii) generating, based at least in part on each generated hybrid class, a qualified historical multi-party communication transcript data object subset; and (iv) identifying, from the qualified historical multi-party communication transcript data object subset and utilizing one or more of a variety of techniques (e.g., exploratory data analysis (EDA), term frequency-inverse document frequency (TF-IDF), subject matter expert knowledge/input, and/or the like), keywords that are deemed important for generating hierarchical-workflow risk scores for multi-party communication transcript data objects.

A qualified historical multi-party communication transcript data object subset may describe a historical multi-party communication transcript data object that satisfies a keyword-generation criteria such as a hybrid class criteria. For example, in some embodiments, a qualified historical multi-party communication transcript data object subset comprises historical multi-party communication transcript data objects having a hybrid class (e.g., primary class and/or secondary class) that is related to the event-of interest (e.g., having a hybrid class (call reason code and/or additional context code) that is related to COB). Accordingly, in some embodiments, the set of historical multi-party communication transcript data object subsets is filtered based at least in part on the hybrid class for each historical multi-party communication transcript data object therein to generate a qualified historical multi-party communication transcript data object subset that comprises only historical multi-party communication transcript data objects having a hybrid class that is related to the event-of-interest (e.g., coordination of benefits).

Figure 7:
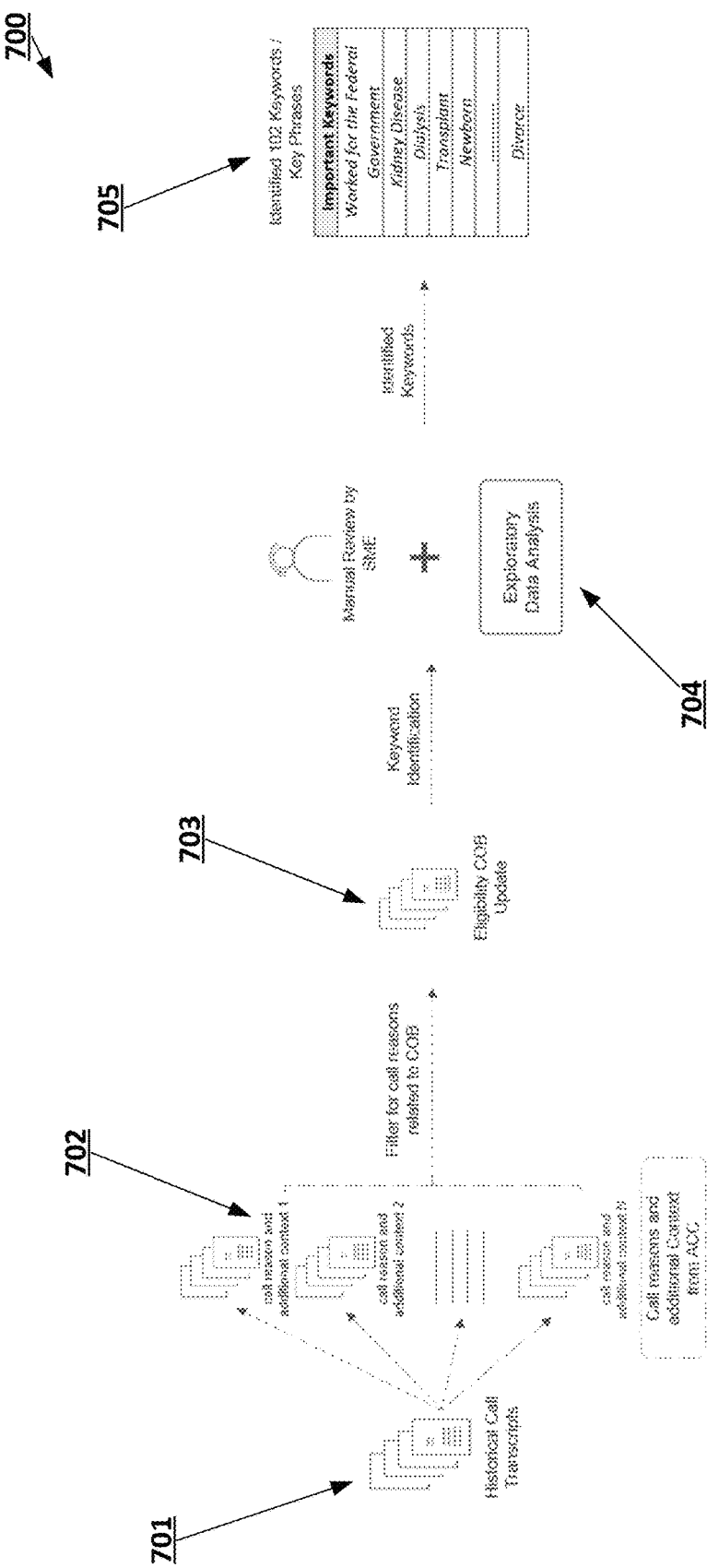
FIG. 7 provides an operational example of generating a keyword schema in accordance with some embodiments discussed herein.

FIG. 7 provides an operational example 700 of generating a keyword repository. As depicted in FIG. 7, the process 700 begins when a plurality of historical multi-party communication transcript data objects 701 are received, and for each received historical multi-party communication transcript data object, a hybrid class 702 is generated utilizing a hybrid classification machine learning model, where for each historical multi-party communication transcript data objects 701, the generated hybrid class 702 comprises a hybrid class selected from the hybrid classification space comprising N hybrid classes. As further depicted in FIG. 7, subsequent to generating the hybrid classes for the historical multi-party communication transcript data objects, the historical multi-party communication transcript data objects are filtered, based at least in part on whether the hybrid class for the respective historical multi-party communication transcript data object is related to COB (e.g., hybrid class criteria), to generate a qualified historical multi-party communication transcript data object subset 703 that comprises each historical multi-party communication transcript data object that satisfies the hybrid class criteria. As further depicted in FIG. 7, keywords that are deemed important for determining a hierarchical-workflow risk score for multi-party communication transcript data objects are identified utilizing exploratory data analysis 704 and/or subject matter expert knowledge/input, and the identified keyword(s) are compiled to generate the keyword schema 705.

In some embodiments, the hybrid-class-based-risk scoring machine learning model is trained/generated based at least in part on training input data that is associated with a set of predictive entities and a set of ground-truth values corresponding to the set of predictive entities, where each ground-truth value is associated with a corresponding predictive entity in the set of predictive entities. In some embodiments, the set of ground-truth values is associated with a ground-truth temporal data object. The ground-truth temporal data object may describe a time window (e.g., day, month, year, and/or the like) within which each ground-truth value in the set of ground-truth values was generated/determined. For example, given a ground-truth temporal data of July, 2021, the set of ground-truth values may comprise only ground-truth values that were identified, with respect to corresponding predictive entities, during the month of July, 2021. An example of a ground-truth temporal data object is a COB verification period that describes a time period where a set of members are verified to determine, for each member, whether the member has coordination of benefits (e.g., a coordination of benefits indicator). In some embodiments, the set of ground-truth values may be generated by one or more workflows, such as a COB verification workflow that comprises verifying the COB status of a member based at least in part on outbound calls to the members. In some embodiments, the set of ground-truth values is received from one or more external computing entities associated with the noted one or more workflows. In some embodiments, the set of ground-truth values are received/retrieved from a server storage system associated with the noted one or more workflows.

In some embodiments, the training input data for the hybrid-class-based-risk scoring machine learning model comprises input features generated and/or extracted from a set of retrospective multi-party communication transcript data objects. A retrospective multi-party communication transcript data object may describe a multi-party communication transcript data for a predictive entity that is within the set of predictive entities associated with the set of ground-truth values object and whose temporal data is within a retrospective period relative to the ground-truth temporal data object for the set of ground-truth values. The retrospective period may describe a selected time period (e.g., configurable time period) that precedes the ground-truth temporal data object. For example, continuing with the example above, given a set of predictive entities associated with a set of ground-truth values having a ground-truth temporal data of July, 2021 and given that the retrospective period is 6 months, the set of retrospective multi-party communication transcript data objects may comprise multi-party communication transcript data objects for the set of predictive entities having temporal data that is within the 6 months prior to July, 2021 (e.g., having temporal data between January and June, 2021). The temporal data for a particular multi-party communication transcript data object may describe the time, date (e.g., day, month, and/or year), and/or the like of the occurrence of the communication associated with the particular multi-party communication transcript data object (e.g., the communication with respect to which the multi-party communication transcript data object was generated).

Figure 8:
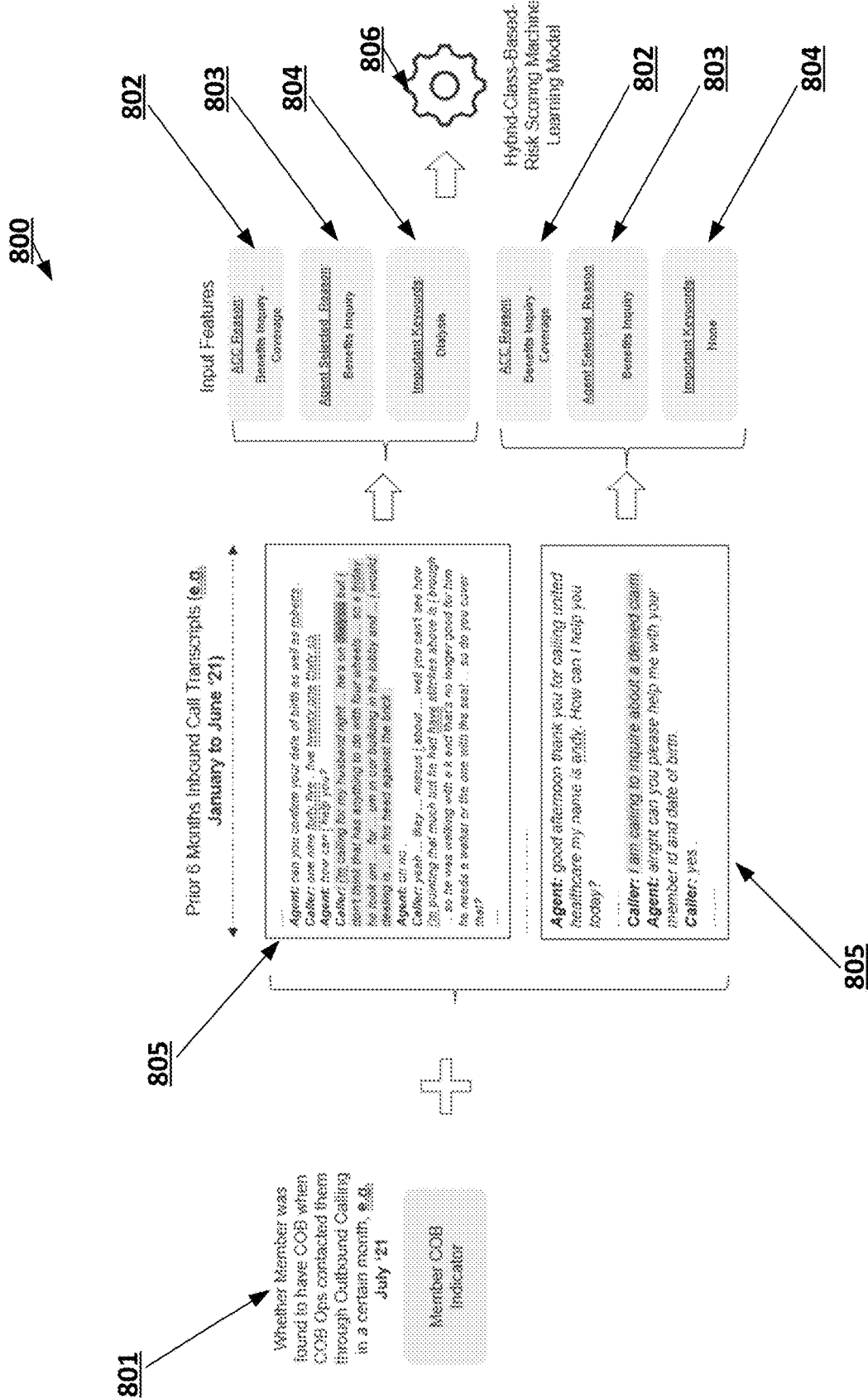
FIG. 8 provides an operational example of training data for a hybrid-class-based-risk scoring machine learning model in accordance with some embodiments discussed herein.

In some embodiments, the training input features comprise the hybrid class for each retrospective multi-party communication transcript data object, the predesignated label for each retrospective multi-party communication transcript data object, and the keyword occurrence data objects (if any) for the retrospective multi-party communication transcript data objects. FIG. 8 depicts an operational example 800 of training data for a hybrid-class-based-risk scoring machine learning model. As depicted in FIG. 8, coordination of benefits ground-truth values 801 for a set of members along with training input features (hybrid class 802, predesignated label 803, and keywords 804 (if any) extracted/generated from retrospective historical multi-party communication transcript data objects 805 are provided as training data to train/generate the hybrid-class-based-risk scoring machine learning model 806.

Returning to step/operation 404, the predictive data analysis computing entity 106 generates, based at least in part on the machine-learning-based risk score (e.g., initial risk score) and using a hierarchical risk score adjustment workflow, the hierarchical-workflow risk score for the multi-party communication transcript data object that is indicative of a predicted event-of-interest status for the predictive entity associated with the multi-party communication transcript data object, such as a predicted coordination of benefit status for a member of a health insurance plan provider for the predictive member. In some embodiments, the hierarchical risk score adjustment workflow is characterized by an ordered sequence of L workflow layers, (ii) each ith non-initial workflow layer is triggered when an (i−1)th workflow layer generates an affirmative workflow determination, (iii) a final workflow layer is configured to generate the hierarchical-workflow risk score, and (iv) the L workflow layers comprise: (a) a first workflow layer that is configured to generate the affirmative workflow determination in response to determining that the machine-learning-based risk score satisfies a machine-learning-based risk score threshold, (b) a second workflow layer that is configured to generate the affirmative workflow determination in response to determining that the multi-party communication transcript data object fails to satisfy one or more targeted exclusion criteria, (c) a third workflow layer that is configured to generate the affirmative workflow determination using one or more historical communication review operations performed with respect to one or more historical multi-party communication transcript data objects that are associated with a predictive entity for the multi-party communication transcript data object, and (d) the final workflow layer that is configured to generate the hierarchical-workflow risk score using one or more entity verification operations performed with respect to the predictive entity that is associated with the multi-party communication transcript data object.

Figure 9:
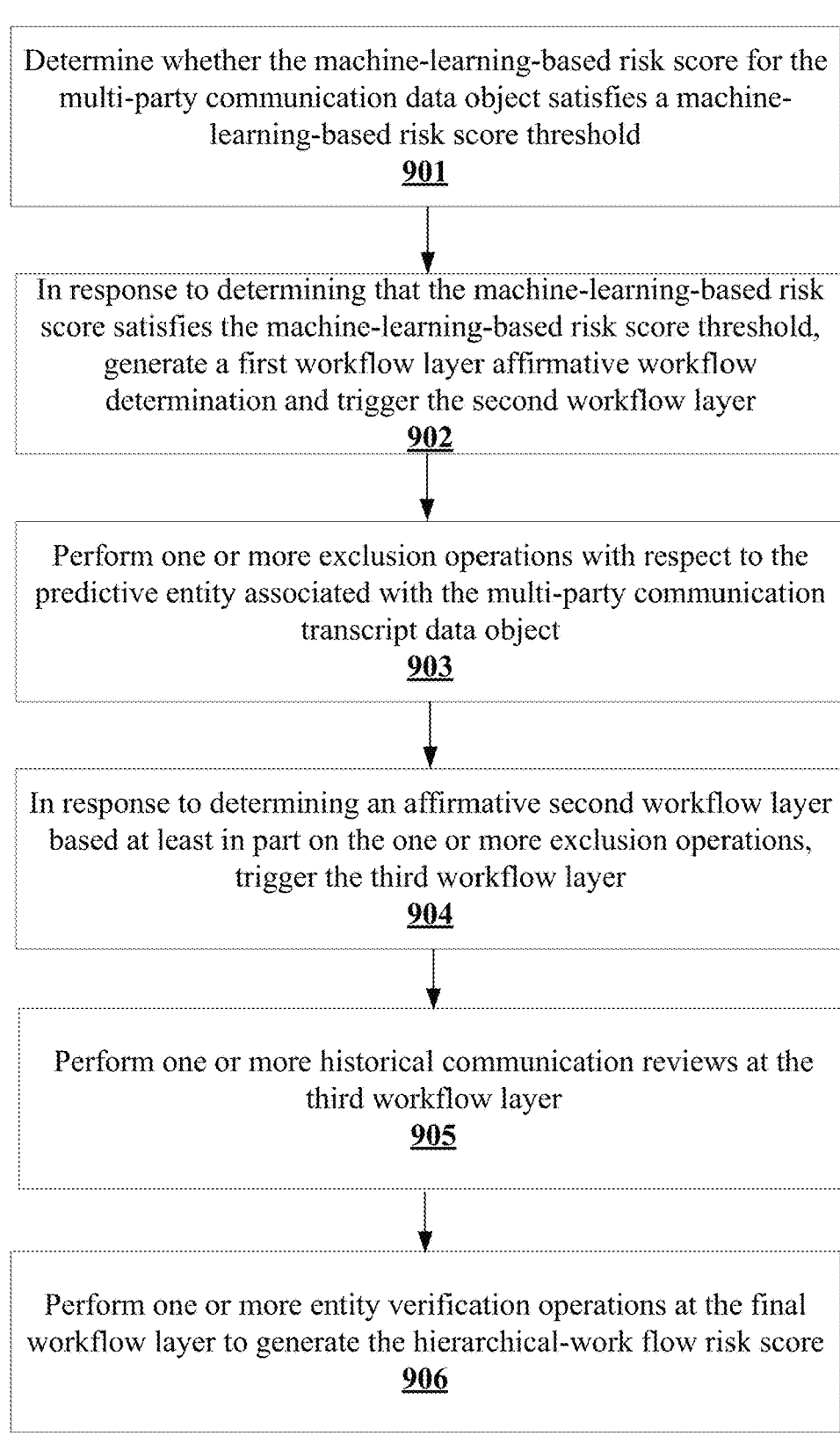
FIG. 9 provides an example process of generating a hierarchical-workflow risk score using a hierarchical risk score adjustment workflow in accordance with some embodiments discussed herein.

In some embodiments, step/operation 404 may be performed in accordance with the process that is depicted in FIG. 9, which is an example process for generating a hierarchical-workflow risk score for a multi-party communication transcript data object using a hierarchical risk score adjustment workflow The process that is depicted in FIG. 9 begins at step/operation 901 when the predictive data analysis computing entity 106 determines (e.g., at the first workflow layer) whether the machine-learning-based risk score for the multi-party communication transcript data object satisfies a machine-learning-based risk score threshold.

At step/operation 902, in response to determining that the machine-learning-based risk score for the multi-party communication transcript data object satisfies the machine-learning-based risk score threshold, the predictive data analysis computing entity 106 generates a first workflow layer affirmative workflow determination and triggers the second workflow layer for the particular multi-layer communication transcript data object with respect to the associated predictive entity.

At step/operation 903, the predictive data analysis computing entity 106 performs one or more exclusion operations (e.g., at the second workflow layer) with respect to the predictive entity associated with the multi-party communication transcript data object based at least in part on one or more targeted exclusion criteria. Accordingly, in some embodiments, performing the one or more exclusion operations comprises determining whether at least one targeted exclusion criteria is not satisfied. In some embodiments, in response to determining that multi-party communication transcript data object with respect to the predictive entity fails to satisfy one or more targeted exclusion criteria. the predictive data analysis computing entity 106 generates an affirmative workflow determination for the second workflow layer. Examples, of targeted exclusion criteria include regular-expression criteria (e.g., negation, keywords logic, and/or the like), database-match criteria, portal-match criteria, and/or the like. For example, the one or more targeted exclusion criteria may comprise one or more regular-expression-based exclusion criteria. (e.g., regular-expression criteria). As another example, the one or more targeted exclusion criteria may comprise database-match criteria (e.g., performed using an excluded entity database). In an example embodiment, the predictive data analysis computing entity 106 performs one or more of the following targeted exclusion operations: (i) a first exclusion operation using a negation regular-expression criteria and/or a keywords logic regular-criteria; (ii) a second exclusion operation using a database-match criteria performed using an excluded entity database; and (iii) a third exclusion operation using a portal-match criteria performed using an exclude entity portal.

In some embodiments, performing the one or more exclusion operations based at least in part on the negation regular-expression criterion comprises: (i) determining whether there is negation with respect to the event-of-interest within the multi-party communication transcript data object; and (ii) in response to determining a negation, generating an indication that the multi-party communication transcript data object with respect to the predictive entity failed to satisfy the negation regular expression criterion. Continuing with the COB example, consider for example where the multi-party communication transcript data object comprises an agent party utterance "Do you have another insurance" followed by a member party utterance "No" (e.g., within 2 to 4 utterances of the agent party utterance). In the noted COB example, the predictive data analysis computing entity 106 may be configured to determine negation in the multi-party communication transcript data object and accordingly generate an indication that the multi-party communication transcript data object with respect to the predictive entity failed to satisfy the negation regular expression criterion (thus failed to satisfy a target exclusion criterion).

In some embodiments, performing the one or more exclusion operations based at least in part on a database-match criteria comprises: (i) determining whether the predictive entity associated with the multi-party communication transcript data object is identified (e.g., tagged) in one or more excluded entity databases (e.g., related to the event-of-interest) as being associated with the event-of-interest, and (ii) in response to determining that the predictive entity is identified/tagged in the at least one excluded entity database as being associated with the event of interest, generating an indication that the multi-party communication transcript data object with respect to the predictive entity failed to satisfy the database-match exclusion criterion. An excluded entity database may describe a database that includes the result/output of one or more verification operations (workflows, and/or the like) indicating whether a given predictive entity is associated with the event-of-interest (e.g., whether the predictive entity is associated with COB), where in some embodiments, the one or more verification operations is performed by one or more computing entities other than the predictive data analysis computing entity 106. Continuing with the COB example, consider where one or more excluded entity databases (e.g., consumer databases) includes an affirmative verification indicator that indicates that the predictive entity associated with a multi-party communication transcript data object was verified as having COB. In the noted example, the predictive data analysis computing entity 106 may be configured to determine that the multi-party communication transcript data object with respect to the predictive entity failed to satisfy a database-match criteria (thus failed to satisfy a targeted exclusion criterion).

In some embodiments, performing the one or more exclusion operations based at least in part on a portal-match criteria comprises: (i) determining whether the predictive entity associated with the multi-party communication transcript data object is associated with the event-of-interest based at least in part on information present in one or more portals and/or workflows related to the event-of-interest (such as family members claim data, family's other insurance information, and/or the like in a COB event-of-interest example), and (ii) in response to determining that the associated predictive entity is associated with the event-of-interest, generating a second workflow layer affirmative workflow determination.

At step/operation 904, in response to a generated second workflow layer affirmative workflow determination, the third workflow layer is triggered that comprises performing one or more historical communication review operations performed with respect to one or more historical multi-party communication transcript data objects that are associated with the predictive entity for the multi-party communication transcript data object.

Figure 10:
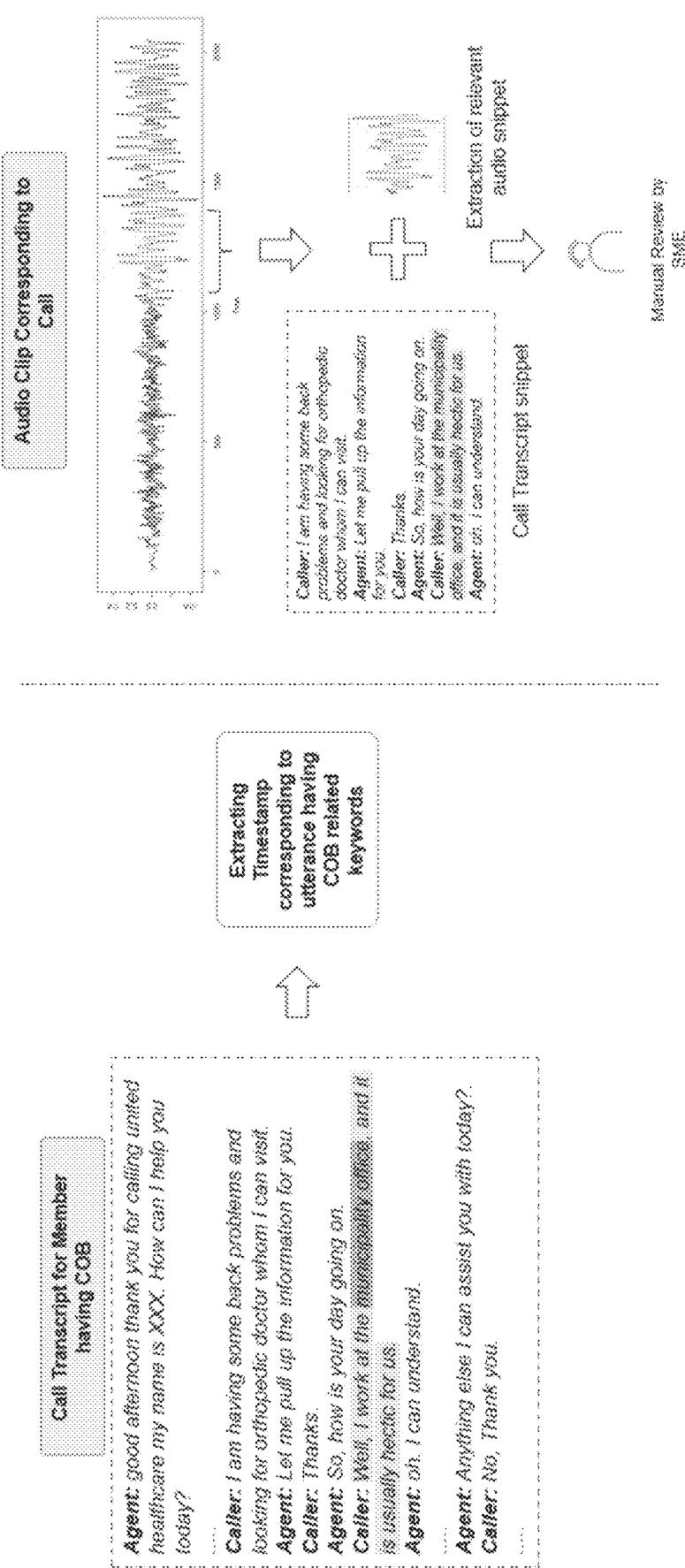
FIG. 10 provides an operational example of performing historical communication review operations in accordance with some embodiments discussed herein.

At step/operation 905, one or more historical communication review operations is performed with respect to one or more historical multi-party communication transcript data objects that are associated with the predictive entity for the multi-party communication transcript data object. In some embodiments, performing the one or more historical communication review operations comprises: (i) identifying one or more historical multi-party communication data objects (e.g., audio files) for the predictive input entity associated with the historical multi-party communication transcript data object; (ii) for each of the identified historical multi-party communication data objects, identifying (e.g., receiving, retrieving, and/or the like), corresponding historical multi-party communication transcript data objects and extracting timestamps corresponding to utterances having event-of-interest-related keywords, such as coordination of benefits-related keywords; and (iv) extract, from segments/portions of the historical multi-party communication data objects corresponding to the timestamps, communication data to verify the machine learning-based risk score, such that false positives are further reduced or eliminated. FIG. 10 depicts an operation example 1000 of performing historical communication review operations.

Returning to FIG. 9 at step/operation 906, the hierarchical-workflow risk score is generated using one or more entity verification operations performed with respect to the predictive entity that is associated with the multi-party communication transcript data object. An example of an entity verification operation is communicating with one or more other entities, such as health insurance plan providers in a COB entity-of-interest scenario to verify the predictive entity's COB status and/or to coordinate claims payment.

Returning to FIG. 4 at step/operation 405, the predictive data analysis computing entity 106 performs one or more prediction-based actions based at least in part on the hierarchical-workflow risk score. In some embodiments, performing the one or more prediction-based actions comprises generating a hierarchical-workflow risk score alert notification indicative of whether the predictive entity is associated with the event-of-interest, such as coordination of benefits. The hierarchical-workflow risk score alert notification may be provided to one or more external computing entities 102 such that one or more users (e.g., business entities, certain employees within an organization, and/or the like) may be aware of the predicted hierarchical-workflow risk score that is indicative of the event-of-interest status. As such, the one or more users may automatically be informed of predictive entities which are associated with the event-of-interest, such as predictive entities that have coordination of benefits. In some embodiments, performing the one or more prediction-based actions comprises generating display data for a prediction output user interface that displays the hierarchical-workflow risk score for one or more predictive entities, such as the prediction output user interface 1100 of FIG. 11 that displays unique identifiers (e.g., user ID) for the predictive entities along with the corresponding hierarchical-workflow risk score for the predictive entities.

In some embodiments, performing the one or more prediction-based actions comprises performing operational load balancing for the post-prediction systems (e.g., for coordination of benefits systems that use predicted coordination of benefits scores as inputs to their investigative operations). For example, in some embodiments, a predictive data analysis computing entity determines D investigation classifications for D predictive entities based at least in part on the D predicted hierarchical-workflow risk scores for the D predictive entities. Then, the count of D predictive entities that are associated with an affirmative investigation classification, along with a resource utilization ratio for each document data object, can be used to predict a predicted number of computing entities needed to perform post-prediction processing operations (e.g., automated investigation operations, such as automated COB investigation operations) with respect to the D predictive entities. For example, in some embodiments, the number of computing entities needed to perform post-prediction processing operations (e.g., automated investigation operations) with respect to D predictive entities can be determined based at least in part on the output of the equation: $R=\text{ceil}(\Sigma_k^{k=K} \text{ur}_k)$, where R is the predicted number of computing entities needed to perform post-prediction processing operations with respect to the D predictive entities, cello) is a ceiling function that returns the closest integer that is greater than or equal to the value provided as the input parameter of the ceiling function, k is an index variable that iterates over K predictive entities among the D predictive entities that are associated with affirmative classifications determined based at least in part on predicted hierarchical-workflow risk scores, and $ur_k$ is the estimated resource utilization ratio for a kth predictive entity that may be determined based at least in part on a count of utterances/tokens/words in the kth predictive entity. In some embodiments, once R is generated, a predictive data analysis computing entity can use R to perform operational load balancing for a server system that is configured to perform post-prediction processing operations (e.g., automated investigation operations) with respect to D predictive entities. This may be done by allocating computing entities to the post-prediction processing operations if the number of currently-allocated computing entities is below R, and deallocating currently-allocated computing entities if the number of currently-allocated computing entities is above R.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
generating, based at least in part on a multi-party communication transcript data object and using one or more processors and a hybrid space classification machine learning model, a hybrid class for the multi-party communication transcript data object that comprises a primary class for the multi-party communication transcript data object and a secondary class for the multi-party communication transcript data object, wherein: (i) the primary class is selected from a primary classification space, and (ii) the secondary class is selected from a secondary classification space that is distinct from the primary classification space;
generating, based at least in part on the hybrid class and using the one or more processors and a hybrid-class-based risk scoring machine learning model, a machine-learning-based risk score for the multi-party communication transcript data object;
generating, based at least in part on the machine-learning-based risk score and using the one or more processors and a hierarchical risk score adjustment workflow, a hierarchical-workflow risk score for the multi-party communication transcript data object, wherein: (i) the hierarchical risk score adjustment workflow is characterized by an ordered sequence of L workflow layers, (ii) each ith non-initial workflow layer is triggered when an (i−1)th workflow layer generates an affirmative workflow determination, (iii) a final workflow layer of the ordered sequence of L workflow layers generates the hierarchical-workflow risk score, and (iv) the ordered sequence of L workflow layers comprise: (a) a first workflow layer that generates the affirmative workflow determination in response to determining that the machine-learning-based risk score satisfies a machine-learning-based risk score threshold, (b) a second workflow layer that generates the affirmative workflow determination in response to determining that the multi-party communication transcript data object fails to satisfy one or more targeted exclusion criteria, (c) a third workflow layer that generates the affirmative workflow determination using one or more historical communication review operations performed with respect to one or more historical multi-party communication transcript data objects that are associated with a predictive entity for the multi-party communication transcript data object, and (d) the final workflow layer that generates the hierarchical-workflow risk score using one or more entity verification operations performed with respect to the predictive entity that is associated with the multi-party communication transcript data object; and
initiating, using the one or more processors, the performance of one or more prediction-based actions based at least in part on the hierarchical-workflow risk score.

2. The computer-implemented method of claim 1, wherein the one or more targeted exclusion criteria comprise one or more regular-expression-based exclusion criteria.

3. The computer-implemented method of claim 1, wherein the one or more targeted exclusion criteria comprise one or more database-match criteria performed using an excluded entity database.

4. The computer-implemented method of claim 1, wherein the hybrid-class-based risk scoring machine learning model generates the machine-learning-based risk score based at least in part on the hybrid class, a predesignated label for the multi-party communication transcript data object, and a keyword occurrence data object that describes occurrences of a keyword schema in the multi-party communication transcript data object.

5. The computer-implemented method of claim 4, wherein the keyword schema comprises keywords identified in qualified historical multi-party communication transcript data objects.

6. The computer-implemented method of claim 1, wherein:
the primary classification space comprises a plurality of defined primary classes, and
each defined primary class is associated with a respective distinct secondary classification space that comprises one or more sub-classes of the plurality of defined primary classes.

7. The computer-implemented method of claim 1, wherein the hybrid-class-based risk scoring machine learning model is a binary classification machine learning model.

8. A computing system comprising one or more processors and at least one memory including program code, the at least one memory and the program code configured to, with the one or more processors, cause the computing system to at least:
generate, based at least in part on a multi-party communication transcript data object and using a hybrid space classification machine learning model, a hybrid class for the multi-party communication transcript data object that comprises a primary class for the multi-party communication transcript data object and a secondary class for the multi-party communication transcript data object, wherein: (i) the primary class is selected from a primary classification space, and (ii) the secondary class is selected from a secondary classification space that is distinct from the primary classification space;

generate, based at least in part on the hybrid class and using a hybrid-class-based risk scoring machine learning model, a machine-learning-based risk score for the multi-party communication transcript data object;

generate, based at least in part on the machine-learning-based risk score and using a hierarchical risk score adjustment workflow, a hierarchical-workflow risk score for the multi-party communication transcript data object, wherein: (i) the hierarchical risk score adjustment workflow is characterized by an ordered sequence of L workflow layers, (ii) each ith non-initial workflow layer is triggered when an (i−1)th workflow layer generates an affirmative workflow determination, (iii) a final workflow layer of the ordered sequence of L workflow layers generates the hierarchical-workflow risk score, and (iv) the ordered sequence of L workflow layers comprise: (a) a first workflow layer that generates the affirmative workflow determination in response to determining that the machine-learning-based risk score satisfies a machine-learning-based risk score threshold, (b) a second workflow layer that generates the affirmative workflow determination in response to determining that the multi-party communication transcript data object fails to satisfy one or more targeted exclusion criteria, (c) a third workflow layer that generates the affirmative workflow determination using one or more historical communication review operations performed with respect to one or more historical multi-party communication transcript data objects that are associated with a predictive entity for the multi-party communication transcript data object, and (d) the final workflow layer that generates the hierarchical-workflow risk score using one or more entity verification operations performed with respect to the predictive entity that is associated with the multi-party communication transcript data object; and initiating the performance of one or more prediction-based actions based at least in part on the hierarchical-workflow risk score.

9. The computing system of claim 8, wherein the one or more targeted exclusion criteria comprise one or more regular-expression-based exclusion criteria.

10. The computing system of claim 8, wherein the one or more targeted exclusion criteria comprise one or more database-match criteria performed using an excluded entity database.

11. The computing system of claim 8, wherein the hybrid-class-based risk scoring machine learning model generates the machine-learning-based risk score based at least in part on the hybrid class, a predesignated label for the multi-party communication transcript data object, and a keyword occurrence data object that describes occurrences of a keyword schema in the multi-party communication transcript data object.

12. The computing system of claim 11, wherein the keyword schema comprises keywords identified in qualified historical multi-party communication transcript data objects.

13. The computing system of claim 8, wherein:
the primary classification space comprises a plurality of defined primary classes, and each defined primary class is associated with a respective distinct secondary classification space that comprises one or more sub-classes of the plurality of defined primary classes.

14. The computing system of claim 8, wherein the hybrid-class-based risk scoring machine learning model is a binary classification machine learning model.

15. One or more non-transitory computer-readable storage media including instructions that, when executed by one or more processors, cause the one or more processors to:

generate, based at least in part on a multi-party communication transcript data object and using a hybrid space classification machine learning model, a hybrid class for the multi-party communication transcript data object that comprises a primary class for the multi-party communication transcript data object and a secondary class for the multi-party communication transcript data object, wherein: (i) the primary class is selected from a primary classification space, and (ii) the secondary class is selected from a secondary classification space that is distinct from the primary classification space;

generate, based at least in part on the hybrid class and using a hybrid-class-based risk scoring machine learning model, a machine-learning-based risk score for the multi-party communication transcript data object;

generate, based at least in part on the machine-learning-based risk score and using a hierarchical risk score adjustment workflow, a hierarchical-workflow risk score for the multi-party communication transcript data object, wherein: (i) the hierarchical risk score adjustment workflow is characterized by an ordered sequence of L workflow layers, (ii) each ith non-initial workflow layer is triggered when an (i−1)th workflow layer generates an affirmative workflow determination, (iii) a final workflow layer of the ordered sequence of L workflow layers generates the hierarchical-workflow risk score, and (iv) the ordered sequence of L workflow layers comprise: (a) a first workflow layer that generates the affirmative workflow determination in response to determining that the machine-learning-based risk score satisfies a machine-learning-based risk score threshold, (b) a second workflow layer that generates the affirmative workflow determination in response to determining that the multi-party communication transcript data object fails to satisfy one or more targeted exclusion criteria, (c) a third workflow layer that generates the affirmative workflow determination using one or more historical communication review operations performed with respect to one or more historical multi-party communication transcript data objects that are associated with a predictive entity for the multi-party communication transcript data object, and (d) the final workflow layer that generates the hierarchical-workflow risk score using one or more entity verification operations performed with respect to the predictive entity that is associated with the multi-party communication transcript data object; and initiate the performance of one or more prediction-based actions based at least in part on the hierarchical-workflow risk score.

16. The one or more non-transitory computer-readable storage media of claim 15, wherein the one or more targeted exclusion criteria comprise one or more regular-expression-based exclusion criteria.

17. The one or more non-transitory computer-readable storage media of claim 15, wherein the one or more targeted exclusion criteria comprise one or more database-match criteria performed using an excluded entity database.

18. The one or more non-transitory computer-readable storage media of claim 15, wherein the hybrid-class-based risk scoring machine learning model generates the machine-learning-based risk score based at least in part on the hybrid class, a predesignated label for the multi-party communication transcript data object, and a keyword occurrence data object that describes occurrences of a keyword schema in the multi-party communication transcript data object.

19. The one or more non-transitory computer-readable storage media of claim 18, wherein the keyword schema comprises keywords identified in qualified historical multi-party communication transcript data objects.

20. The one or more non-transitory computer-readable storage media of claim 15, wherein:
the primary classification space comprises a plurality of defined primary classes, and
each defined primary class is associated with a respective distinct secondary classification space that comprises one or more sub-classes of the plurality of defined primary classes.

* * * * *